US009348667B2

(12) United States Patent
Kim et al.

(10) Patent No.: US 9,348,667 B2
(45) Date of Patent: May 24, 2016

(54) APPARATUS FOR MANAGING APPLICATION PROGRAM AND METHOD THEREFOR

(71) Applicant: HAN ALL TECHNOLOGY, INC., Seoul (KR)

(72) Inventors: Tae Yeop Kim, Gwangmyeong-si (KR); Heon Chae, Seoul (KR)

(73) Assignee: HAN ALL TECHNOLOGY INC., Seoul (KR)

( * ) Notice: Subject to any disclaimer, the term of this patent is extended or adjusted under 35 U.S.C. 154(b) by 0 days.

(21) Appl. No.: 14/759,912

(22) PCT Filed: Dec. 16, 2013

(86) PCT No.: PCT/KR2013/011654
§ 371 (c)(1),
(2) Date: Jul. 8, 2015

(87) PCT Pub. No.: WO2014/109487
PCT Pub. Date: Jul. 17, 2014

(65) Prior Publication Data
US 2016/0004576 A1    Jan. 7, 2016

(30) Foreign Application Priority Data

Jan. 8, 2013  (KR) .......................... 10-2013-0002053

(51) Int. Cl.
*G06F 3/00* (2006.01)
*G06F 9/54* (2006.01)

(52) U.S. Cl.
CPC ............... *G06F 9/541* (2013.01); *G06F 9/543* (2013.01)

(58) Field of Classification Search
None
See application file for complete search history.

(56) References Cited

U.S. PATENT DOCUMENTS

| 5,301,326 | A  | * | 4/1994  | Linnett  | G06F 9/543 719/320 |
| 6,338,084 | B1 | * | 1/2002  | Rankin   | G06F 9/543 709/213 |
| 6,473,820 | B1 | * | 10/2002 | Zhang    | G06F 9/526 710/200 |
| 2003/0167421 | A1 | * | 9/2003 | Klemm | G06F 11/1438 714/37 |
| 2003/0217287 | A1 | * | 11/2003 | Kruglenko | G06F 21/50 726/19 |
| 2011/0307640 | A1 | * | 12/2011 | Jones | G06F 9/4812 710/260 |
| 2012/0005679 | A1 |  | 1/2012 | Shin et al. | |
| 2013/0073729 | A1 |  | 3/2013 | Yun | |

FOREIGN PATENT DOCUMENTS

EP    2418582    2/2012

* cited by examiner

*Primary Examiner* — Andy Ho
*Assistant Examiner* — Carina Yun
(74) *Attorney, Agent, or Firm* — Goldilocks ZONE IP Law

(57) ABSTRACT

An embodiment of the present invention relates to an apparatus for managing an application program (AP) and a method therefor, and includes a processing module which, if the AP execution process thread corresponding to an AP to be terminated in a program block of an information processing device is terminated, reads the module information of each thread and the stack information of each module so as to select the module and stack having charge of processing a dynamic data exchange (DDE) message among each thread module and each module stack, and releases the termination of the thread including the selected module and stack. Thus, even in the state of terminating each AP execution process thread of the AP to be terminated (for example, user's unused AP), various problems due to the delay of processing the DDE message may be readily avoided.

4 Claims, 3 Drawing Sheets

APPARATUS FOR MANAGING APPLICATION PROGRAM AND METHOD THEREFOR

FIELD OF THE INVENTION

The present disclosure relates to an apparatus for managing an application program (hereinafter referred to as "AP") and a method therefor. More particularly, the present disclosure relates to an apparatus for managing an AP that allows, at the operating system side, only a thread including a module and a stack related to dynamic data exchange (DDE) message processing to be normally placed in an unsuspended environment even in a state that threads for each AP execution process of a target AP (for example, a user's unused AP) are stopped, to provide guidance on easy avoidance of various problems caused by a DDE message processing delay at the user side, and a method therefor.

BACKGROUND OF THE INVENTION

Recently, with the rapid development of electric/electronic/communication related technology, various types of application programs (APs) (for example, word processing APs, drawing APs, office management APs, communication APs, Internet access APs, and the like) are being widely developed/spread. Thus, various types of fundamental technologies are being developed to more effectively manage corresponding APs.

For example, Korean Patent Registration No. 10-1053681 (titled "a user terminal, and a method and apparatus for controlling software management thereof") (published Aug. 2, 2011) discloses a software access control method characterized by comprising ① monitoring a user terminal, ② determining whether software is in an unused state for a predetermined period of time or more after the user terminal had access to the software running on a software providing apparatus, and when the software is in an unused state, determining to forcibly releasing the connection of the user terminal to the software, ③ temporarily storing works done so far by the user terminal in the software, and requesting, to the user terminal, the generation of a process for forcibly releasing the connection of the user terminal to the software, and ④ providing the user terminal with a control message of the process for temporary storage of works and forcibly releasing.

However, the technology for forcibly releasing the connection of a terminal not using software as disclosed in the Patent No. 10-1053681 has a very significant increase in load at a server end because all main processes are performed at the server end. In addition, a serious problem occurs, for example, a great increase in the total time taken to perform the processes.

Particularly, the technology for forcibly releasing the connection of a terminal not using software as disclosed in the Patent No. 10-1053681 employs an extreme method of terminating the unused software rather than temporarily pausing it. Thus, when a user tries to reuse the software, the user cannot but endure the inconvenience of having to execute the corresponding terminated software again from the start.

To solve this problem, conventionally, it has been persuasively suggested to select a target AP (for example, an unused AP) and stop threads for each execution process of the selected AP to temporarily pause the corresponding target AP. In this case, the corresponding target AP is not completely terminated and its operation is temporarily paused. Thus, when reusing the target AP, a user can easily avoid the inconvenience of having to execute it again from the start.

However, AP suspension technology according to the related art stops the threads included in the process of the target AP all together. Thus, unless any action is taken, an operating system of an information processing device employing the AP suspension technology according to the related art cannot utilize even a thread including a module and a stack responsible for dynamic data exchange (DDE) message processing among each of the threads of the target AP at all. Thus, there is a serious situation to face up in which the entire DDE message processing of the information processing device is significantly delayed.

Of course, if DDE message processing is delayed, the user cannot readily use the target AP as well as other APs. As a result, the overall AP quality in use is greatly reduced.

Technical Problem

Therefore, embodiments of the present disclosure allow, at the operating system side, only a thread including a module and a stack related to dynamic data exchange (DDE) message processing to be normally unsuspended even in a state that threads for each application program (AP) execution process of a target AP (for example, a user's unused AP) are stopped. Thereby, various problems caused by a DDE message processing delay may be easily avoided at the user side.

Other objects of the present disclosure will become more fully apparent from the following detailed description and the accompanying drawings.

Technical Solution

One embodiment of the present disclosure discloses an apparatus for managing an application program (AP) that communicates with an operating system controlling an AP by the medium of an application program interface (API) function in a state that the apparatus is installed in an information processing device, the apparatus including a selection unit to select a target AP among APs being run according to pre-stored AP suspension procedure setting information, a first information acquisition unit to acquire detailed information of AP execution processes corresponding to the APs being run, a second information acquisition unit to communicate with the first information acquisition unit to read detailed information of an AP execution process corresponding to the target AP among the AP execution processes, and acquire handle information of the AP execution process corresponding to the target AP, handle information of threads for each AP execution process corresponding to the target AP, module information for each thread, and stack information for each module, an AP suspension processing unit to communicate with the second information acquisition unit to read the handle information of the AP execution process corresponding to the target AP, the handle information of threads for each AP execution process corresponding to the target AP, the module information for each thread, and the stack information for each module, and suspend the threads for each AP execution process corresponding to the target AP, an unsuspending unit to, when the threads for each AP execution process corresponding to the target AP are suspended by the suspension processing unit, communicate with the suspension processing unit to read the module information for each thread and the stack information for each module, select a module and a stack responsible for dynamic data exchange (DDE) message processing among modules for each thread and stacks for each module, and unsuspend a thread including the selected module and stack, and a control unit to control the selection unit, the first information acquisition unit, the second information acquisition unit, the AP suspension processing unit, and the unsuspending unit.

Also, another embodiment of the present disclosure discloses a method for managing an AP that communicates with an operating system controlling the execution of an AP by the medium of an API function, the method including selecting a target AP among APs being run according to pre-stored AP suspension procedure setting information, acquiring detailed information of AP execution processes corresponding to the APs being run, reading detailed information of an AP execution process corresponding to the target AP among the AP execution processes, and acquiring handle information of the AP execution process corresponding to the target AP, handle information of threads for each AP execution process corresponding to the target AP, module information for each thread, and stack information for each module, reading the handle information of the AP execution process corresponding to the target AP, the handle information of threads for each AP execution process corresponding to the target AP, the module information for each thread, and the stack information for each module, and suspending the threads for each AP execution process corresponding to the target AP, and when the threads for each AP execution process corresponding to the target AP are suspended, reading the module information for each thread and the stack information for each module, selecting a module and a stack responsible for DDE message processing among modules for each thread and stacks for each module, and unsuspending a thread including the selected module and stack.

Advantageous Effects

In one embodiment of the present disclosure, a computing module operable to select a target application program (AP) among APs being run, a computing module operable to call an application program interface (API) function to acquire detailed information of AP execution processes corresponding to the APs being run, a computing module operable to read detailed information of an AP execution process corresponding to the target AP and call an API function to acquire handle information of the AP execution process corresponding to the target AP, handle information of threads for each AP execution process, module information for each thread and stack information for each module, a computing module operable to read the handle information of the AP execution process corresponding to the target AP, the handle information of the threads for each AP execution process, the module information for each thread and the stack information for each module and call an API function to suspend the threads for each AP execution process corresponding to the target AP, and a computing module operable to, when the threads for each AP execution process corresponding to the target AP are stopped, read the module information for each thread and the stack information for each module, select a module and a stack responsible for dynamic data exchange (DDE) message processing among modules for each thread and stacks for each module, and unsuspend a thread including the selected module and stack are systematically arranged and provided within a program block of an information processing device including an operating system. Thus, under the implementation environment of the present disclosure, at the operating system side, only the thread including the module and the stack related to DDE message processing may be normally placed in an unsuspended environment even when the threads for each AP execution process of the target AP (for example, a user's unused AP) are stopped. As a result, various types of problems caused by a DDE message processing delay may be easily avoided at the user side.

DETAILED DESCRIPTION OF CERTAIN EMBODIMENTS OF THE INVENTION

Hereinafter, an apparatus for managing an application program (AP) and a method therefor according to the present disclosure will be described in detail with reference to accompanying drawings.

Figure 1:
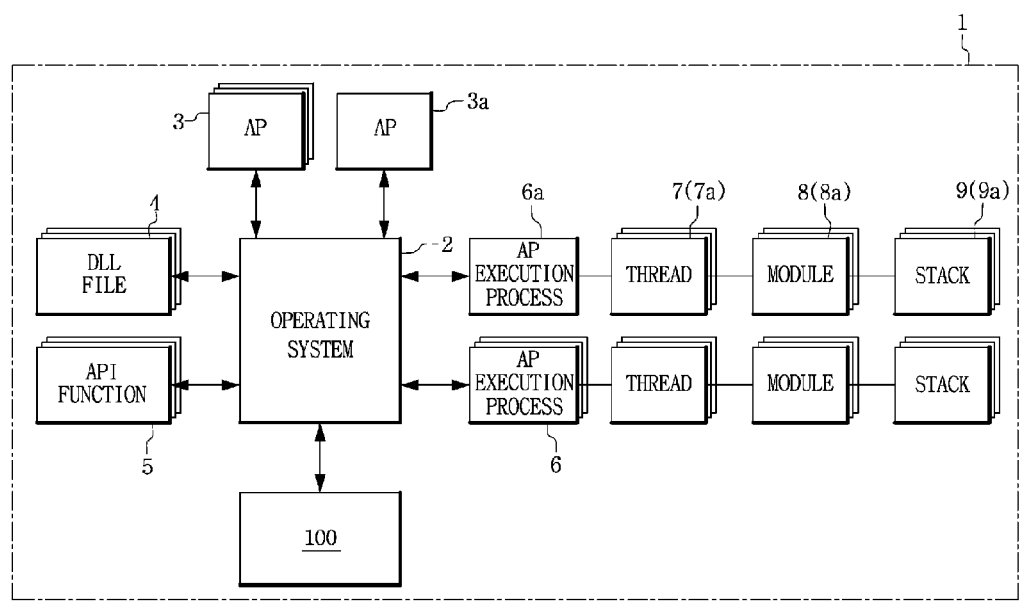
FIG. 1 is a diagram conceptually illustrating an example of a program layout of an application program (AP) management apparatus according to the present disclosure.

As shown in FIG. 1, an operating system 2 (for example, the Microsoft Windows family of operating systems) is installed in an information processing device 1 (for example, a laptop computer, a desktop computer, a smartphone, and a tablet) employing an AP management apparatus 100 according to the present disclosure. In this case, the operating system accurately controls the execution state of different types of APs 3 and 3a (for example, word processing APs, drawing APs, office management APs, communication APs and Internet access Aps, and the like) by the medium of a dynamic link library (DLL) file 4 and an application program interface (API) function 5.

Under this environment, when AP suspension technology according to a related art is applied, threads 7 and 7a included in an execution process 6a of a target AP 3a are stopped all together. Thus, unless any action is taken, the operating system 2 cannot utilize even the thread 7a including a module 8a and a stack 9a responsible for DDE message processing among each of the threads 7 and 7a of the target AP 3a at all. As a result, inevitably, the entire DDE message processing of the information processing device 1 is significantly delayed.

In contrast, when the threads 7 and 7a for each AP execution process 6a corresponding to the target AP 3a are stopped, the AP management apparatus 100 according to the present disclosure reads module information for each thread 7 and 7a and stack information for each module 8 and 8a, and selects a module 8a and a stack 9a responsible for DDE message processing among modules 8 and 8a for each thread 7 and 7a and stacks 9 and 9a for each module 8 and 8a. Subsequently, the AP management apparatus 100 unsuspends the thread 7a including the selected module 8a and stack 9a, so that the operating system 2 may not experience an unnecessary DDE message processing delay problem at all when the function of the target AP (for example, a user's unused AP) is stopped.

Figure 2:
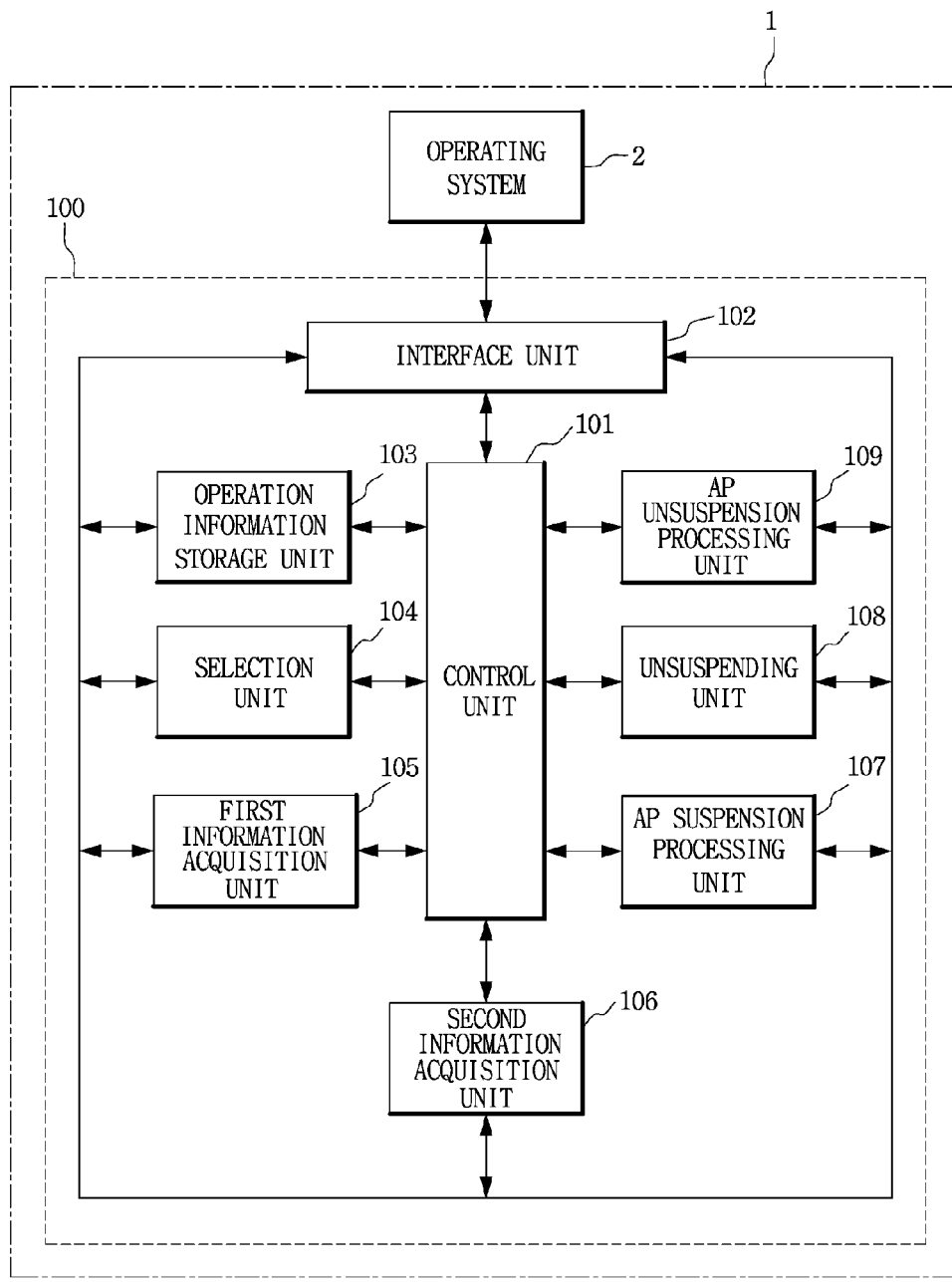
FIG. 2 is a diagram conceptually illustrating an example of a detailed configuration of an AP management apparatus according to the present disclosure.

As shown in FIG. 2, the AP management apparatus 100 according to the present disclosure communicates with the operating system 2 by the medium of an interface unit 102, and may have a relevantly combined configuration of an operation information storage unit 103, a selection unit 104, a first information acquisition unit 105, a second information acquisition unit 106, an AP suspension processing unit 107, an unsuspending unit 108, an AP unsuspension processing unit 109, and a control unit 101 which controls the components of the AP management apparatus 100.

In this instance, the operation information storage unit 103 controlled by the control unit 101 carries out an auxiliary role to normally execute a series of AP management procedures according to the present disclosure without any problem, by storing and managing, in an information storage area of the operation information storage unit 103, various types of operation information necessary for an AP management service according to the present disclosure, for example, registration information of the operating system 2, AP suspension procedure setting information (for example, setting information for selecting an AP not being used by a user for a particular period of time as a target AP or setting information for selecting a particular AP as a target AP) and component information necessary to perform processes of each computing module.

Figure 3:
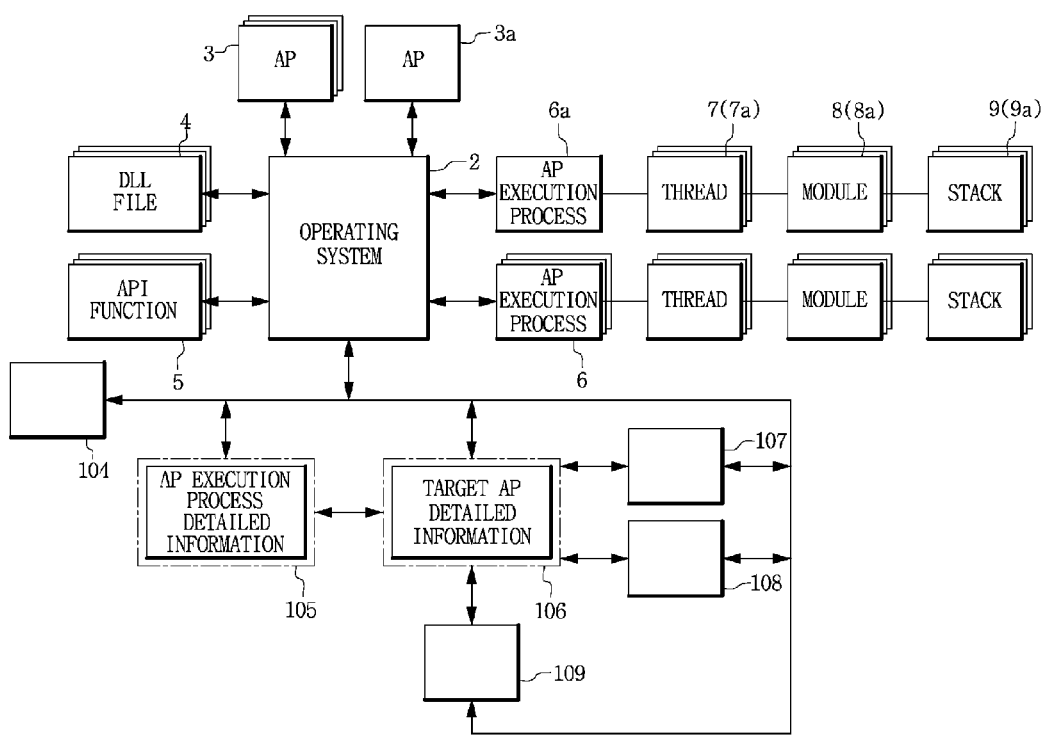
FIG. 3 is a diagram conceptually illustrating an example of a detailed procedure of performing functions of an AP management apparatus according to the present disclosure.

Through this fundamental infrastructure, the selection unit 104 controlled by the control unit 101 communicates with the operating system 2 by the medium of the interface unit 102, as shown in FIG. 3. Thereby, the selection unit 104 checks an execution history of each of the APs 3 and 3a, and communicates with the operation information storage unit 103 to read the AP suspension procedure setting information already stored in the information storage area of the operation information storage unit 103. Subsequently, based on the read contents, the selection unit 104 performs each of the AP execution processes 6 and 6a and selects the target AP 3a among the APs 3 and 3a being run.

For example, an AP not being used by a user for twenty minutes may be selected as the target AP 3a. As another example, ○○ AP commercially available from BB may be selected as the target AP 3a, and as still another example, ΔΔ AP by an unknown manufacturer may be selected as the target AP 3a (The target AP may be variously modified according to circumstances).

By doing this, when the target AP 3a is selected, the first information acquisition unit 105 controlled by the control unit 101 communicates with the selection unit 104 to identify which AP is the target AP 3a. Subsequently, the first information acquisition unit 105 communicates with the operating system 2 by the medium of the interface unit 102 to select a DLL file 4 (for example, dbghelp.dll file) and call an API function 5 (for example, GetProcAddress function). Through this, the first information acquisition unit 105 may acquire detailed information of the AP execution processes 6 and 6a corresponding to the APs 3 and 3a being run (for example, virtual address space information of the AP execution processes 6 and 6a, execution file information loaded in a virtual address space of the AP execution processes 6 and 6a, various types of resource information allocated by the operating system 2 for the AP execution processes 6 and 6a, kernel object information of the AP execution processes 6 and 6a, and thread information of the AP execution processes 6 and 6a) (see FIG. 3).

Through the foregoing procedure, when the first information acquisition unit 105 acquires the detailed information of the AP execution processes 6 and 6a corresponding to the APs 3 and 3a being run, the second information acquisition unit 106 controlled by the control unit 101 communicates with the selection unit 104 to identify which AP is the target AP 3a. Also, the second information acquisition unit 106 communicates with the first information acquisition unit 105 to read the detailed information of the AP execution process 6a corresponding to the target AP 3a (for example, virtual address space information of the AP execution process 6a, execution file information loaded in a virtual address space of the AP execution process 6a, various types of resource information allocated by the operating system 2 for the AP execution process 6a, kernel object information of the AP execution process 6a, and thread information of the AP execution process 6a) among the detailed information of the AP execution processes 6 and 6a corresponding to the APs 3 and 3a being run (see FIG. 3).

When the second information acquisition unit 106 identifies which AP is the target AP 3a and reads the detailed information of the AP execution process 6a corresponding to the corresponding target AP 3a, the second information acquisition unit 106 communicates with the operating system 2 by the medium of the interface unit 102 to call an API function 5 (for example, OpenProcess API function, CreateToolhelp32Snapshot API function, SymLoadModule64 API function, GetThreadContext API function, and StackWalk64 API function). Through this, the second information acquisition unit 106 may acquire handle information of the AP execution process 6a corresponding to the target AP 3a, handle information of the threads 7 and 7a for each AP execution process 6a, context structure value information of the threads 7 and 7a for each AP execution process 6a, module information for each thread 7 and 7a (for example, symbol table information of each module 8 and 8a, memory address value information of each module 8 and 8a, and IMAGEHELP_MODULE64 structure value information of each module 8 and 8a) and stack information for each module 8 and 8a (for example, stack trace information of each stack 9 and 9a) (see FIG. 3).

In this case, among the API functions 5 previously mentioned, the OpenProcess API function is utilized to acquire the handle information of the AP execution process 6a, and the CreateToolhelp32Snapshot API function is utilized to acquire the handle information of the threads 7 and 7a for each AP execution process 6a. Also, the SymLoadModule64 API function is utilized to acquire the module information for each thread 7 and 7a, the GetThreadContext API function is utilized to acquire the context structure value information of the threads 7 and 7a for each AP execution process 6a, and the StackWalk64 API function is utilized to acquire the stack information for each module 8 and 8a.

Through the foregoing procedure, when the handle information of the AP execution process 6a corresponding to the target AP 3a, the handle information of the threads 7 and 7a for each AP execution process 6a, the context structure value information of the threads 7 and 7a for each AP execution process 6a, the module information for each thread 7 and 7a, and the stack information for each module 8 and 8a is acquired, the AP suspension processing unit 107 controlled by the control unit 101 communicates with the second information acquisition unit 106 to read the foregoing detailed information of the target AP (for example, the handle information of the AP execution process 6a corresponding to the target AP 3a, the handle information of the threads 7 and 7a for each AP execution process 6a, the module information for each thread 7 and 7a, and the stack information for each module 8 and 8a) (see FIG. 3).

By doing this, when the reading of the detailed information of the target AP is completed, the AP suspension processing unit 107 communicates with the operating system 2 by the medium of the interface unit 102 to call an API function 5 (for example, SuspendThread API function). Through this, the AP suspension processing unit 107 suspends the threads 7 and 7a for each AP execution process 6a corresponding to the target AP 3a (see FIG. 3).

Meanwhile, through the foregoing procedure, when the threads 7 and 7a for each AP execution process 6a corresponding to the target AP 3a are stopped, the unsuspending unit 108 controlled by the control unit 101 communicates with the AP suspension processing unit 107 to read or acquire the context structure value information of the threads 7 and 7a for each AP execution process 6a, the module information for each thread 7 and 7a (for example, symbol table information of each module 8 and 8a, memory address value information of each module 8 and 8a, and IMAGEHELP_MODULE64 structure value information of each module 8 and 8a), and the stack information for each module 8 and 8a (for example, stack trace information of each stack 9 and 9a) (Each of the information may be read or acquired through communication with the second information acquisition unit 106 according to circumstances).

By doing this, when the context structure value information of the threads 7 and 7a for each AP execution process 6a, the module information for each thread 7 and 7a, and the stack information for each module 8 and 8a is read or acquired, the unsuspending unit 108 selects the module 8a responsible for DDE message processing (for example, USER32.dll) and the stack 9a supposed to take responsibility for DDE message processing by its symbol name, for example, GetMessage and UserwaitMessage, among the modules 8 and 8a for each thread 7 and 7a and the stacks 9 and 9a for each module 8 and 8a. Subsequently, the unsuspending unit 108 unsuspends the thread 7a including the selected module 8a and stack 9a (see FIG. 3).

Like this, when the thread 7a including the module 8a responsible for DDE message processing (for example, USER32.dll) and the stack 9a supposed to take responsibility for DDE message processing by its symbol name, for example, GetMessage and UserwaitMessage, is unsuspended, the corresponding thread 7a is resumed to normally run. In this case, the operating system 2 does not experience an unnecessary DDE message processing delay problem even when the function of the target AP 3a (for example, a user's unused AP) is stopped.

Like this, one embodiment of the present disclosure systematically arranges and provides, within a program block of the information processing device 1 including the operating system 2, a computing module operable to select the target AP 3a among the APs 3 and 3a being run, a computing module operable to call the API function to acquire the detailed information of the AP execution processes 6 and 6a corresponding to the APs 3 and 3a being run, a computing module operable to read the detailed information of the AP execution process 6a corresponding to the target AP 3a and call the API function to acquire the handle information of the AP execution process 6a corresponding to the target AP 3a, the handle information of the threads 7 and 7a for each AP execution process 6a, the module information for each thread 7 and 7a and the stack information for each module 8 and 8a, a computing module operable to read the handle information of the AP execution process 6a corresponding to the target AP 3a, the handle information of the threads 7 and 7a for each AP execution process 6a, the module information for each thread 7 and 7a and the stack information for each module 8 and 8a and call the API function to suspend the threads 7 and 7a for each AP execution process 6a corresponding to the target AP 3a, and a computing module operable to, when the threads 7 and 7a for each AP execution process 6a corresponding to the target AP 3a are stopped, read the module information for each thread 7 and 7a and the stack information for each module 8 and 8a, select the module 8a and the stack 9a responsible for DDE message processing among the modules 8 and 8a for each thread 7 and 7a and the stacks 9 and 9a for each module 8 and 8a, and unsuspend the thread 7a including the selected module 8a and stack 9a. Thus, under the implementation environment of the present disclosure, at the operating system 2 side, only the thread 7a including the module 8a and the stack 9a related to the DDE message processing may be normally placed in an unsuspended environment even when the threads 7 for each AP execution process 6a of the target AP 3a (for example, a user's unused AP) are stopped. As a result, various types of problems caused by a DDE message processing delay may be easily avoided at the user side.

Meanwhile, as shown in FIG. 2, under the control of the control unit 101 according to one embodiment of the present disclosure, the AP unsuspension processing unit 109 may be additionally arranged as well as the foregoing computing modules.

In this instance, the AP unsuspension processing unit 109 controlled by the control unit 101 determines whether a request message for completely unsuspending the target AP has been transmitted from the operating system 2, by communicating with the corresponding operating system 2 by the medium of the interface unit 102.

In this instance, the user using the information processing device 1 may determine whether the request message for completely unsuspending the target AP has been transmitted from the operating system 2 by executing a computing procedure, for example, as if selecting an icon (not shown) of the target AP 3a which has been in placed in a minimized state. When it is determined that the request message has been transmitted, the AP unsuspension processing unit 109 communicates with the operating system 2 by the medium of the interface unit 102 to call an API function 5. Through this, the thread 7 for each AP execution process 6a corresponding to the target AP 3a may be unsuspended (see FIG. 3).

Of course, in this case, at the side of the target AP 3a, not only the function of the thread 7a including the module 8a and the stack 9a related to DDE message processing but also the functions of all the threads 7 including the module 8 and the stack 9 may return normally. As a result, the user may easily utilize the target AP 3a without inconvenience of having to execute the corresponding AP 3a again from the start.

The present disclosure is not limited to a particular field, and generally executes useful effects in a variety of many fields requiring AP management.

Further, it is obvious that while particular embodiments have been hereinabove described and illustrated, the present disclosure may be modified and embodied in various forms by those skilled in the art.

The modified embodiments should not be individually understood from the technical aspects or points of view of the present disclosure, and shall fall within the scope of the appended claims.

INDUSTRIAL APPLICABILITY

According to one embodiment of the present disclosure, at the operating system side, only a thread including a module and a stack related to DDE message processing may be normally unsuspended even in a state that threads for each AP execution process of a target AP (for example, a user's unused AP) are stopped. Thereby, various problems caused by a DDE message processing delay may be easily avoided at the user side.

What is claimed is:
1. An apparatus for managing an application program (AP) that communicates with an operating system controlling an AP by the medium of an application program interface (API) function in a state that the apparatus is installed in an information processing device, the apparatus comprising:

a selection unit to select a target AP among APs being run according to pre-stored AP suspension procedure setting information;

a first information acquisition unit to acquire detailed information of AP execution processes corresponding to the APs being run;

a second information acquisition unit to communicate with the first information acquisition unit to read detailed information of an AP execution process corresponding to the target AP among the AP execution processes, and acquire handle information of the AP execution process corresponding to the target AP, handle information of threads for each AP execution process corresponding to the target AP, module information for each thread, and stack information for each module;

an AP suspension processing unit to communicate with the second information acquisition unit to read the handle information of the AP execution process corresponding to the target AP, the handle information of threads for each AP execution process corresponding to the target AP, the module information for each thread, and the stack information for each module, and suspend the threads for each AP execution process corresponding to the target AP;

an unsuspending unit to, when the threads for each AP execution process corresponding to the target AP are suspended by the suspension processing unit, communicate with the suspension processing unit to read the module information for each thread and the stack information for each module, select a module and a stack responsible for dynamic data exchange (DDE) message processing among modules for each thread and stacks for each module, and unsuspend a thread including the selected module and stack; and a control unit to control the selection unit, the first information acquisition unit, the second information acquisition unit, the AP suspension processing unit, and the unsuspending unit.

2. The apparatus for managing an AP according to claim 1, further comprising:

an AP unsuspension processing unit controlled by the control unit to unsuspend the threads for each AP execution process corresponding to the target AP when receiving a request message for unsuspending the target AP from the operating system.

3. A method for managing an application program (AP) that communicates with an operating system controlling the execution of an AP by the medium of an application program interface (API) function, the method comprising:

selecting a target AP among APs being run according to pre-stored AP suspension procedure setting information;

acquiring detailed information of AP execution processes corresponding to the APs being run;

reading detailed information of an AP execution process corresponding to the target AP among the AP execution processes, and acquiring handle information of the AP execution process corresponding to the target AP, handle information of threads for each AP execution process corresponding to the target AP, module information for each thread, and stack information for each module;

reading the handle information of the AP execution process corresponding to the target AP, the handle information of threads for each AP execution process corresponding to the target AP, the module information for each thread, and the stack information for each module, and suspending the threads for each AP execution process corresponding to the target AP; and when the threads for each AP execution process corresponding to the target AP are suspended, reading the module information for each thread and the stack information for each module, selecting a module and a stack responsible for dynamic data exchange (DDE) message processing among modules for each thread and stacks for each module, and unsuspending a thread including the selected module and stack.

4. The method for managing an AP according to claim 3, further comprising:

unsuspending the threads for each AP execution process corresponding to the target AP when receiving a request message for unsuspending the target AP from the operating system.

* * * * *